(12) United States Patent
Miller et al.

(10) Patent No.: US 9,182,004 B2
(45) Date of Patent: Nov. 10, 2015

(54) ROTARY DAMPER

(71) Applicant: Horizon Hobby, Inc., Champaign, IL (US)

(72) Inventors: Brian Miller, Glendora, CA (US); Brent Redlin, Thorton, CO (US)

(73) Assignee: Horizon Hobby, LLC, Champaign, IL (US)

( * ) Notice: Subject to any disclaimer, the term of this patent is extended or adjusted under 35 U.S.C. 154(b) by 3 days.

(21) Appl. No.: 14/146,290

(22) Filed: Jan. 2, 2014

(65) Prior Publication Data

US 2015/0184714 A1 Jul. 2, 2015

(51) Int. Cl.
*F16F 5/00* (2006.01)
*F16F 9/12* (2006.01)
*F16F 9/504* (2006.01)
*B62D 7/22* (2006.01)
*A63H 17/26* (2006.01)
*B60G 21/06* (2006.01)

(52) U.S. Cl.
CPC ............... *F16F 9/12* (2013.01); *A63H 17/262* (2013.01); *B60G 21/06* (2013.01); *B62D 7/22* (2013.01); *F16F 9/125* (2013.01); *F16F 9/504* (2013.01)

(58) Field of Classification Search
USPC ............. 188/290–296, 306; 74/572.2, 574.4; 16/51, 82; 446/465–469; 280/99, 280/124.11
See application file for complete search history.

(56) References Cited

U.S. PATENT DOCUMENTS

| | | | | |
|---|---|---|---|---|
| 1,924,802 | A | * | 8/1933 | Orpen .......................... 188/130 |
| 2,409,505 | A | * | 10/1946 | Magrum ....................... 188/309 |
| 3,119,469 | A | * | 1/1964 | Farr et al. ..................... 188/276 |
| 3,439,936 | A | * | 4/1969 | Hines ............................ 280/432 |
| 4,893,522 | A | * | 1/1990 | Arakawa ....................... 464/180 |
| 4,926,984 | A | * | 5/1990 | Pollitt ........................... 188/310 |
| 5,116,201 | A | * | 5/1992 | Fradenburgh et al. ........ 416/140 |
| 5,152,189 | A | | 10/1992 | Miura et al. |
| 5,165,506 | A | * | 11/1992 | Guimbretiere ................ 188/290 |
| 5,305,858 | A | * | 4/1994 | Haga et al. .................... 188/271 |
| 5,400,878 | A | * | 3/1995 | D'Anna et al. ............... 188/306 |
| 7,032,985 | B1 | * | 4/2006 | Ichioka et al. ............. 312/319.2 |
| 2005/0115784 | A1 | * | 6/2005 | Muller et al. ................. 188/290 |

FOREIGN PATENT DOCUMENTS

| | | |
|---|---|---|
| EP | 0697541 B1 | 7/1999 |
| EP | 0742381 B1 | 2/2002 |
| EP | 0908644 B | 11/2003 |

OTHER PUBLICATIONS

Analysis: Rotary Dampers, Nov. 25, 2011.

* cited by examiner

*Primary Examiner* — Christopher Schwartz
(74) *Attorney, Agent, or Firm* — McDonnell Boehnen Hulbert & Berghoff LLP

(57) ABSTRACT

A rotary damper for remote-controlled vehicles is described. The rotary damper includes a housing containing a fluid, a rotary joint, a rotating member, a protrusion extending from the first end of the rotating member dividing a space within the housing into at least two portions, and a rocker arm. In operation, a linear motion applied to the rocker arm translates into rotary motion on the rotating member, causing the protrusion to move through the fluid within the housing. An elastic member may be coaxially mounted on the rotating member to resist the rotary motion translated from the rocker arm. The elastic member generates a spring force, and the protrusion moving through the liquid generates a damping force. In other examples, the damping force is generated using a fluid-shearing object moving through the liquid, such as a slotted disc or an impeller.

19 Claims, 4 Drawing Sheets

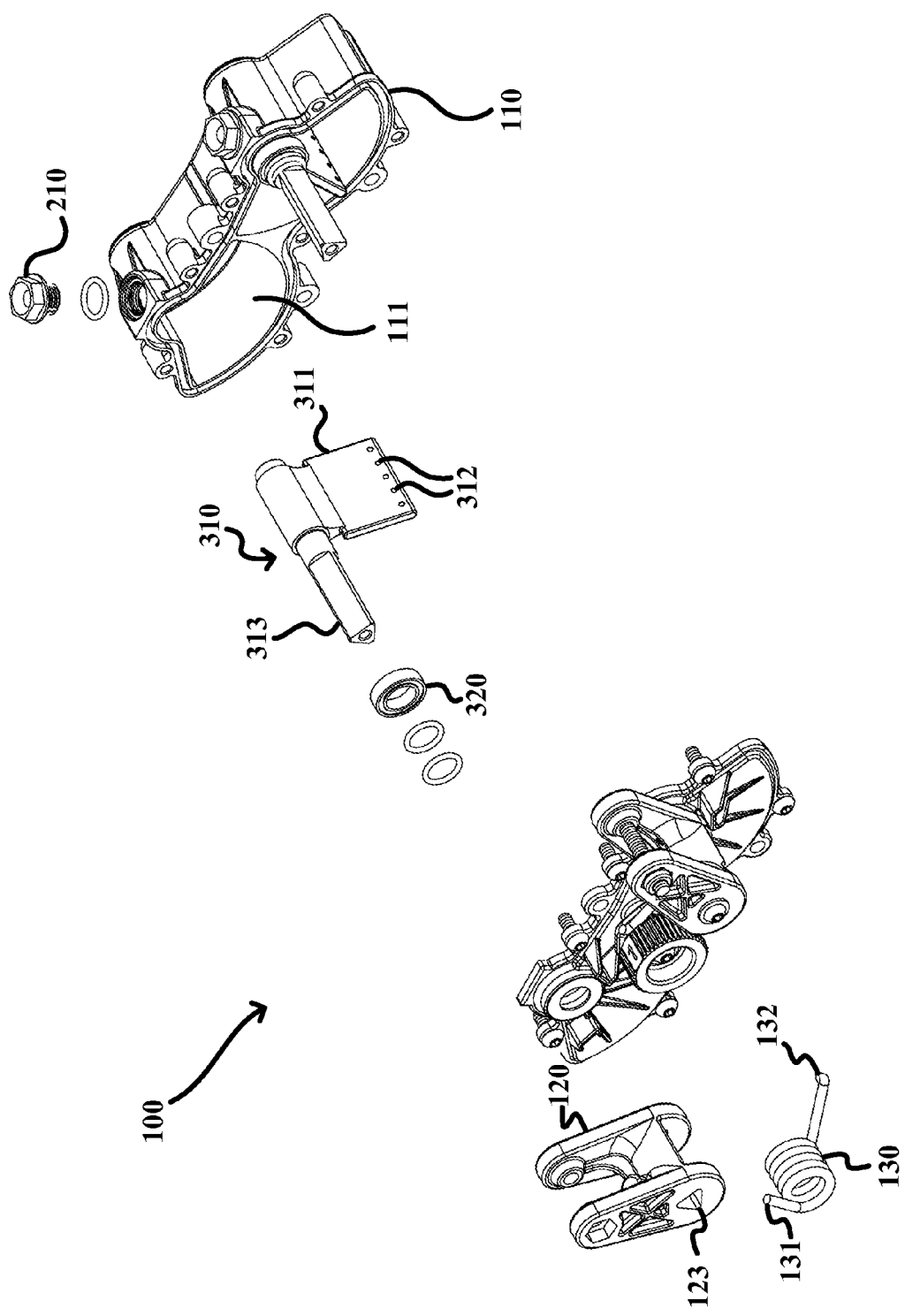

ROTARY DAMPER

BACKGROUND

A shock absorber is generally described as a device for absorbing sudden kinetic impulses. This absorption is accomplished by storing the energy from the kinetic impulse—typically with an elastic object, such as spring—and dissipating the stored energy by passing an object through a viscous medium, for example. The spring can be made from a variety of materials, including steel, titanium, wood, fiberglass, or carbon fiber. Alternatively, the elastic object may also be implemented as a compressible gas, such as nitrogen, in a sealed chamber. The energy dissipation, or damping, is typically achieved by moving a piston with one or more holes in it through a viscous fluid, causing fluid to flow through the holes in the piston to either side of a sealed enclosure. The kinetic "shock" is absorbed in the elastic object, such as a spring, and causes the elastic object to begin oscillating. The absorption of the shock is caused by the dissipation of this oscillation, by generating a damping force on the oscillation by passing an object through a viscous medium.

Shock absorption in RC vehicles has typically been accomplished through the use of linear dampers. Linear dampers commonly employ a spring or compressible gas that actuates a piston in a sealed chamber of fluid. The spring stores kinetic energy, and a piston dissipates the energy as it moves through the fluid.

While linear dampers are simple to manufacture, they introduce a number disadvantages, especially in RC vehicles. For optimum vehicle handling, it is advantageous to have heavy components placed close to the centerline of the vehicle. However, linear dampers and springs are often placed close to the wheels of the vehicle and far from the centerline of the vehicle, resulting in suboptimal performance. Additionally, linear dampers in open-wheeled vehicles introduce an obstruction that affects the aerodynamics of the vehicle. Furthermore, linear dampers are heavy and large, requiring compromises in the design of a vehicle's suspension, steering, chassis, and body.

SUMMARY

A rotary damper for a remote-controlled vehicle comprises a housing containing a fluid, a rotary joint, a rotating member, a protrusion extending from the first end of the rotating member dividing a space within the housing into at least two portions, and a rocker arm. The rotary joint is located on a surface of the housing. The rotating member is connected to the rotary joint between a first end and a second end of the rotating member. The protrusion extends from the first end of the rotating member, dividing a space within the housing into at least two portions. The protrusion also includes at least one orifice allowing the fluid to flow between the at least two portions within the housing. The rocker arm is connected to the second end of the rotating member. The rocker arm has a first end and a second end, and the first end of the rocker arm translates linear motion on the rocker arm into rotary motion on the rotating member causing axial rotation of the protrusion.

In one example, the second end of the rocker arm is connected to an elastic member that resists the rotary motion. In another example, the rotary damper also comprises an adjuster mounted to the housing for adjusting a preload of the elastic member. The adjuster includes a spring, a ball detent, and a cam connected to a first end of the elastic member, such that rotating the cam changes a contact point of the elastic member. In yet another example, the rotary damper also includes a reservoir connected to the housing through at least one valve allowing fluid to flow between the reservoir and the housing. The valve may be actuated by heat to maintain a constant fluid pressure within the housing. The valve may alternatively be actuated by a g-force and varies a fluid pressure within the housing. In another example, the housing of the rotary damper also includes a sealable hole to allow the fluid within the housing to be replaced.

In another example, a rotary damper for a remote-controlled vehicle comprises a housing containing a fluid, a first plurality of discs statically secured to the inside of the housing, a rotary joint, a rotating member, a second plurality of discs extending from the rotating member, and a rocker arm. The rotary joint is located on the surface of the housing, and the rotating member is connected to the rotary joint between a first end and a second end of the rotating member. The second plurality of discs extends radially from the rotating member and are arranged to move between the first plurality of discs that is stationary within the housing. Rotation of the rotating member shears the fluid within the housing between the stationary first plurality of discs and the rotating second plurality of discs. An adjuster, reservoir, and valve as previously described may also be included in other embodiments using the first and second pluralities of discs.

In yet another example, a rotary damper comprising a housing containing a fluid, a rotary joint, a rotating member, and a rocker arm as previously described also includes an impeller with a plurality of fins connected to an end of the rotating member enclosed within the housing.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

FIG. 3 illustrates an expanded view of a rotary damper and spring module, according to an example.

DETAILED DESCRIPTION

The following detailed description includes references to the accompanying figures. In the figures, similar symbols typically identify similar components, unless context dictates otherwise. The examples described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1:
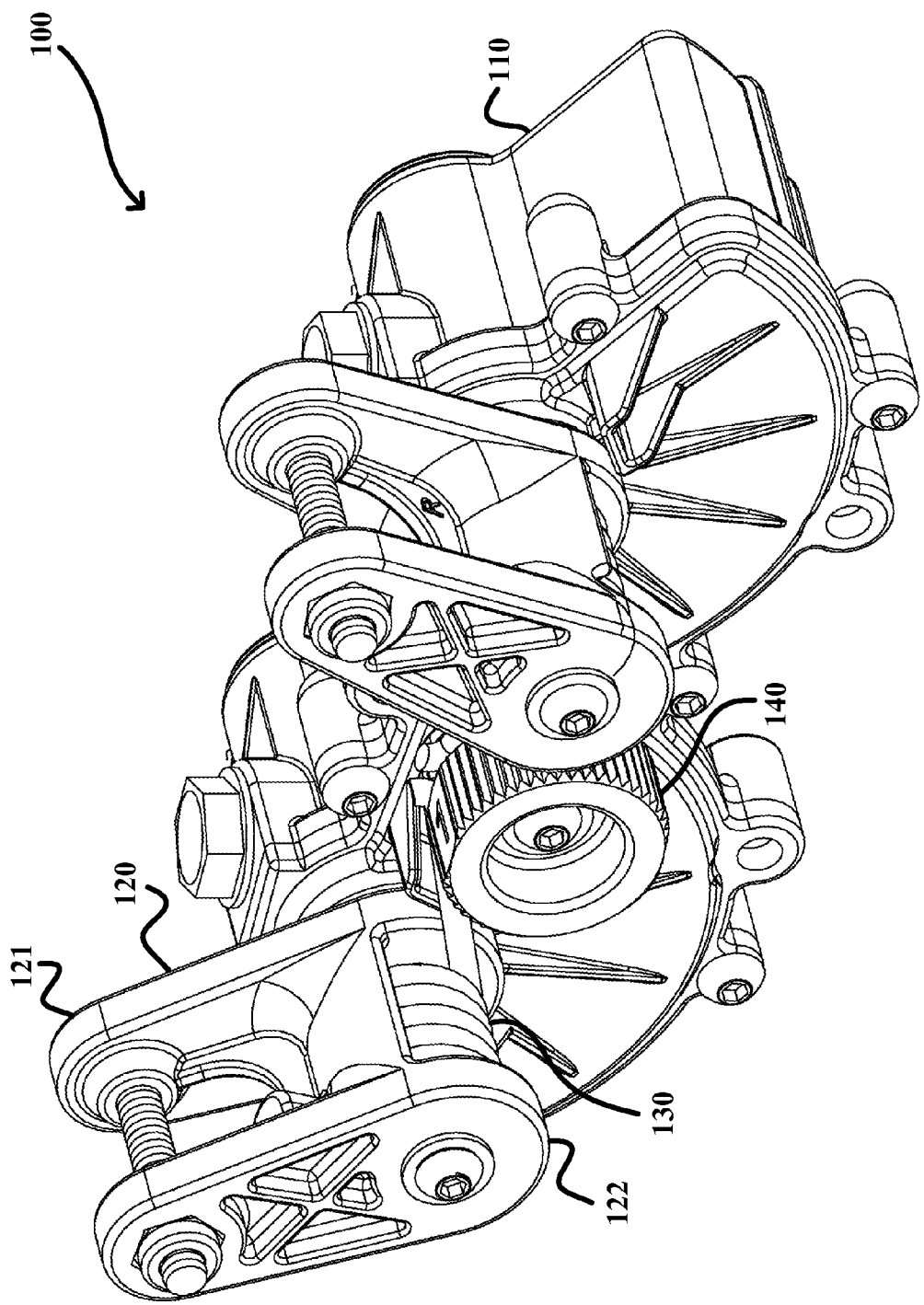
FIG. 1 illustrates a front view of a rotary damper and spring module, according to an example.

A rotary damper described herein refers to a single damper that is actuated by a single linear force on its rocker arm. This rotary damper may or may not include a spring or other elastic object. The rotary damper and spring module 100 depicted in FIG. 1 shows two such rotary dampers, along with two springs, combined into one rotary damper and spring module. This combination of two rotary dampers into one module as described below is an example. The rotary damper and spring module 100 could have any number of rotary dampers and springs in various examples.

FIG. 1 illustrates a front view of a rotary damper and spring module 100. The rotary damper and spring module 100 has a housing 110 containing a viscous fluid, a rotating member 310, a rocker arm 120, and an elastic member 130. The rotating member 310 extends from the fixed end 122 of rocker arm 120 into the housing; the rotating member 310 is more clearly depicted in FIG. 3. The rocker arm 120 translates a linear motion into rotary motion onto the rotating shaft. As the rotating member 310 moves in a rotary direction, it either compresses or decompresses the elastic member 130, causing a spring force in the opposite direction. Rotation of the rotating member 310 also pushes a protrusion 311 within the housing through the viscous liquid, providing resistance to the rotary motion and generating a damping force on the rotary motion. The damping force may be provided in a variety of ways, which are as follows.

The housing 110 of the rotary damper and spring module 100 is sealed and is filled with a viscous fluid. A face of housing 110 has a rotary joint 320, allowing for an object to be rotatably connected to the housing 110 while maintaining a liquid-tight seal. The housing 110 can be made from a variety of materials, such as plastic, aluminum, titanium, and magnesium. Stronger materials are preferred to prevent deformation of the housing under high pressures, and materials that transfer heat well are preferred to dissipate heat generated in the fluid. The housing 110 may be a variety of shapes and sizes and still achieve the desired damping. In an example, the housing is mounted to the chassis of a remote-controlled vehicle.

Rocker arm 120 receives linear motion at its outer end 121 and translates the linear motion into rotary motion at its fixed end 122. The fixed end 122 of the rocker arm 120 is connected to a rotating member 310 such that it is pivoted at the point where the shaft connects to the rocker arm 120. In one example, a push rod actuated by a remote-controlled vehicle's suspension may be applied to the outer end 121 of rocker arm 120, translating the linear motion of the push rod into rotary motion at the rocker arm's fixed end 122. This linear motion may either push or pull the outer end 121, rotating the rocker arm 120 in a clockwise or counterclockwise direction. As a result, linear motion on the rocker arm 120 is translated to rotary motion on the rotating member 310.

A rotating member 310 is connected to the housing 110 through a rotary joint 320 on a face of the housing 110. The rotating member 310 may be a shaft made of a rigid material. In an example, the portion of the rotating member 310 that is inside of the housing 110 has a protrusion 311 extending from it that moves through the viscous fluid when the rotating member 310 is rotated. This protrusion 311 may be any object that is fixed to the rotating member 310 that resists rotation of the rotating member 310 as it passes through the viscous fluid, such as a vane, an impeller, or a set of slotted discs. The opposite end of the rotating member 310 that is outside of the housing 110 is connected to the fixed end 122 of the rocker arm 120. In an example, the protrusion 311 is a vane that divides a space 111 within the housing 110 into two sections and has orifices 312 that allow the passage of fluid between the two sections of the housing 110. A damping force is generated by restricting the flow of fluid through these orifices 312 as the vane moves through the fluid. Alternatively, the rotating member 310 may have more than one vane, each vane having any number of orifices 312. Each of the orifices 312 may be of the same size or of different sizes. In other words, any combination of a number of vanes, orifices 312, and sizes of orifices may be used in order to generate a desired damping force.

The elastic member 130 is a flexible object that is used to store mechanical energy. The elastic member 130 may be implemented to provide a torsional resistance in a direction opposite of a rotary motion that is applied to the rotating member 310; for example, when rotating member 310 is twisted in a clockwise direction, elastic member 130 exerts a force (torque) in a counter-clockwise direction. An elastic member 130 that provides a torsional resistance may be implemented as a torsion spring, a torsion bar, or any other elastic object that produces a torque when twisted. The elastic member 130 can be made from a variety of materials, including steel, titanium, wood, fiberglass, or carbon fiber. In an example, rotary damper and spring module 100 implements the elastic member 130 as a torsion spring that is coaxially mounted along the rotating member 310. In this example, a linear motion provided at the outer end 121 of rocker arm 120 is translated to rotary motion at fixed end 122 of rocker arm 120, which is secured to rotating member 310. As the rotating member 310 rotates, it twists the torsion spring, producing a torque in the direction opposite of the provided rotary motion.

Alternatively, elastic member 130 may be implemented to provide a linear resistance when either compressed or decompressed. In one example, the elastic member 130 is not included in the rotary damper and spring module 100, but instead is a linear spring secured to a push rod, and the push rod is connected to the outer end 121 of rocker arm 120. When the push rod is actuated by a remote-controlled vehicle's suspension, for example, the spring either compresses or decompresses, producing a linear spring force on the push rod. In another example, the linear spring force is provided on a vehicle's suspension as a leaf spring. In yet another example, the linear spring force is provided by compressing a gas within a sealed chamber. A person of ordinary skill in the art would recognize the variety of ways a linear spring force may be achieved. It should be noted that the elastic member 130 may or may not be included as a part of the rotary damper.

An adjuster 140 is a mechanical device that can be used to increase or decrease a preload, or amount of compression or decompression of a spring as measured from its free length, of elastic member 130. In an example, the adjuster 140 includes a rotating cam that is fixed to the housing 110 against a spring and ball detent, such that the cam is fixed to the housing 110 but may be rotated in a clockwise or counter-clockwise direction. One end of elastic member 130 has a flap 132 that is secured to the rotating cam of adjuster 140. When the rotating cam of adjuster 140 is rotated, it either compresses or decompresses the elastic member 130, adjusting the preload of the elastic member 130. This preload adjustment alters the resistance experienced on a rotary motion applied to the rotating member 310, effectively increasing or decreasing the spring rate of the torsion spring. Alternatively, the adjuster 140 may be provided independently from the rotary damper, such as when the elastic member 130 is a linear spring located off the module. If the elastic member 130 is incorporated with the mechanism actuating the rocker arm 120, the adjuster 140 would be implemented in such a way that it would adjust the preload of a linear spring. A person of ordinary skill in the art would understand that the elastic member 130 and the adjuster 140 may be implemented in a variety of ways independent from the rotary damper.

Figure 2:
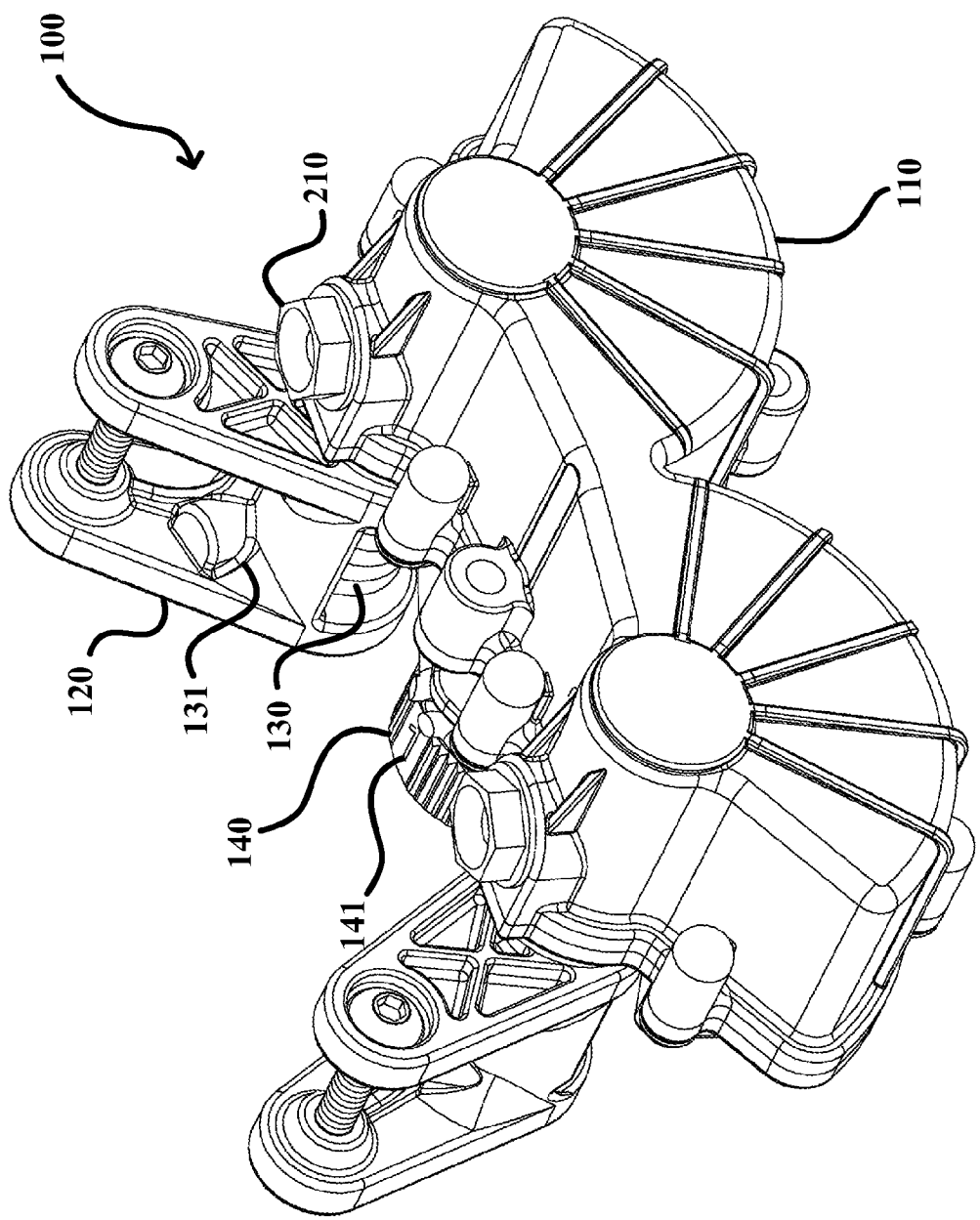
FIG. 2 illustrates a back view of a rotary damper and spring module, according to an example.

FIG. 2 illustrates a back view of the rotary damper and spring module 100 according to an example.

The housing 110 includes a sealable hole 210 that allows for the viscous fluid to be easily drained and filled. The sealable hole 210 may be implemented as a threaded hole allowing for a screw to tightly seal the hole to prevent gasses or liquids from escaping. Additionally, the sealable hole 210 allows all air to be removed from the inside of the housing 110. In an example, this sealable hole is located at the top of the housing 110 as depicted in FIG. 2.

The adjuster 140 adjusts the spring force supplied by the elastic member 130 as previously described. In an example, the adjuster 140 includes a set of numbers visible on the cam itself, such as number 141, indicating the amount of preload that has been adjusted by adjuster 140. Note that the visible numbers, such as number 141, are arbitrary and do not necessarily correlate to a physical unit of measurement.

FIG. 3 illustrates an expanded view of a rotary damper and spring module 100 according to an example.

Enclosed within housing 110 is a space 111, which may be filled with a viscous fluid and contains within it the portion of the rotating member 130 having the protrusion 311. As protrusion 311 sweeps through the space 111 filled with a viscous fluid, the fluid passes through one or more orifices 312. In an example, the protrusion 311 is a vane with one or more orifices 312. While only one protrusion 311 is depicted in FIG. 3, rotating member 120 may include multiple protrusions 311 in other examples. Each of these protrusions 311 may have one or more orifices 312, and the orifices 312 may also vary in size.

The rotating member 310 is secured to the housing through rotary joint 320. This rotary joint 320 may be a ball bearing with rubber O-rings used to prevent the fluid in the housing from leaking out through the rotary joint 320. The extending end 313 of rotating member 310 is secured to rocker arm 120. In an example, this connection is achieved by a number of flat faces on the extending end 313. Slot 123 on the rocker arm 120 is shaped to allow the extending end 313 of rotating member 310 to securely fit, thereby translating any linear motion on the rocker arm 120 to rotary motion on the rotating member 310. In another example, extending end 313 may include splines to secure a connection between the rocker arm 120 and rotating member 310. In yet another example, the extending end 313 may be a round cylinder with a hole extending through the diameter of rotating member 310, allowing for a pin to be secured through the rocker arm 120 and the rotating member 310. A person of ordinary skill in the art would recognize that there are a variety of ways to secure the rotating member 310 to the rocker arm 120.

In the expanded view of the rotary damper and spring module 100, the elastic member 130 is more clearly depicted to reveal its fixed end 131 and its opposite extending end having flap 132. Fixed end 131 of elastic member 130 is fixed to the rocker arm 120, as previously described and as depicted in FIG. 2. The opposite end of elastic member 130 includes a flap 132 that sits in a groove on the cam of an adjuster, such as adjuster 140 in FIG. 2. In an example, rotating the cam of an adjuster 140 moves a contact point of flap 132, thereby compressing or decompressing the elastic member 130 and adjusting its preload.

Additionally, the damping force produced by the rotary damper may be adjusted. The greater the number of orifices 312 on the protrusion 311, the more easily the fluid passes between either side of the protrusion 311. In the same regard, having larger orifices 312 would also allow fluid to pass more easily from one side of the protrusion 311 to the other. Both such adjustments would reduce the damping force produced by the rotary damper. Conversely, fewer orifices 312 and/or smaller orifices 312 restrict the flow of fluid passing through the protrusion 311, increasing the damping force on rotary motion applied to the rotating member 310. Furthermore, the fluid filled within space 111 of housing 110 may be any viscous medium. By filling space 111 with a fluid having a high viscosity, the damping force experienced on the rotary motion applied to rotating member 310 will be greater than if the viscosity of the fluid was low, which would provide less resistance to the movement of the protrusion 311 through the fluid. In an example, the viscous fluid is silicone oil for its minimal fluid breakdown and its excellent heat-transfer characteristics.

Another way to provide damping is through the use of magnetorheological fluid. Magnetorheological fluid includes micrometer-scaled magnetic particles suspended in a carrier fluid. When magnetorheological fluid is subjected to a magnetic field, the evenly dispersed particles become aligned along the magnetic field lines, increasing the apparent viscosity—the "thickness" or resistance to deformation of a fluid—of the magnetorheological fluid. The magnetic field may be provided by placing electromagnets on either side of the magnetorheological fluid, such that the magnetic field is imposed on the magnetorheological fluid between the electromagnets. The strength of the magnetic field can be controlled by adjusting a flow of current through the electromagnets, in turn varying the apparent viscosity of the magnetorheological fluid. Relating to the rotary damper, electromagnets may be placed on protrusions 311 within the housing 110, on the outside of the housing 110, or any other location such that magnetorheological fluid is located between the electromagnets. With control circuitry supplying current to the electromagnets, the damping force may be adjusted based on user input or sensor inputs. For example, a user may reduce the strength of the magnetic field applied to the magnetorheological fluid of a remote-controlled vehicle's rotary damper if the vehicle was driving on rough terrain to reduce the damping. Alternatively, a user may wish to increase the strength of the magnetic field applied to the magnetorheological fluid of a remote-controlled vehicle's rotary damper if the vehicle was driving on a flat surface to increase the damping. Furthermore, sensors may be included on a remote-controlled vehicle to read, for example, the yaw, pitch, and roll of the vehicle, and the magnetic field could be dynamically adjusted based on the sensor readings to improve vehicle stability. By varying the apparent viscosity of the magnetorheological fluid, the flow of fluid through the orifices 312 in a protrusion 311 or the orifices 312 in a series of protrusions 311 is either restricted more or restricted less, varying the produced damping force. In another example, varying the apparent viscosity of the magnetorheological fluid would increase or decrease a shearing force experienced by slotted discs rotating inside the housing 110 between the static discs, varying the produced damping force.

Figure 4:
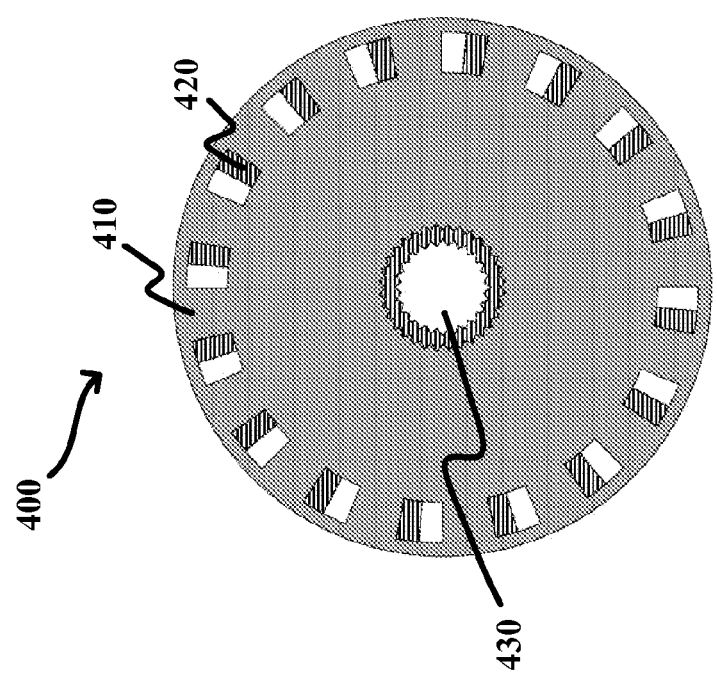
FIG. 4 illustrates a front view of a pair of fluid-shearing discs, according to an example.

FIG. 4 illustrates a front view of a pair of fluid-shearing discs 400. The fluid-shearing discs 400 may be full circular discs with a plurality of slots. FIG. 4 depicts a stationary disc 410 that is fixed in relation to a rotating disc 420. From the perspective of FIG. 4, stationary disc 410 is front of rotating disc 420, and rotating disc 420 is rotated slightly in relation to stationary disc 410 such that it can be seen through slots near the edge of the stationary disc 410. Note that only two discs—one stationary disc 410 and one rotating disc 420—are illustrated to clearly explain the operation of a fluid-shearing disc example; any number of stationary and rotating discs may be implemented to still achieve a desired result.

The fluid-shearing discs 400 may be used as an alternative to generating a damping force using the protrusion 311 with orifices 312 inside a housing 110 containing a viscous fluid. In one example, the damping force on the rotary motion is generated by rotating discs that shear the viscous fluid within the housing. When the fluid-shearing discs 400 are rotated, a shear force is generated in the direction opposite of rotation along the plane of the fluid-shearing discs 400. A rotating member 310 may be secured to a rotating disc 420 at its center 430. This connection may be established using splines as shown in FIG. 4 or by having the rotating disc and shaft machined from a single block of material. A person of ordinary skill in the art would recognize the variety of ways to secure the rotating member 310 to the rotating disc 420.

In an example, the stationary disc 410 is statically secured to the housing. Both of the fluid-shearing discs 400 are located within a sealed housing 110 filled with a viscous fluid. Rotating disc 420 may be rotated with respect to stationary disc 410. When a rotating member 310 connected to rotating disc 420 is rotated, the fluid-shearing discs 400 shear the viscous fluid, and the sheer stress generates a damping force on the rotating shaft. The higher the relative angular velocity between rotating disc 420 and stationary disc 410, the higher the resulting damping force that is generated. Alternatives may implement the slotted discs as a partial circle, such as a semi-circle or a sector of a circle, to achieve the damping force.

Figure 5:
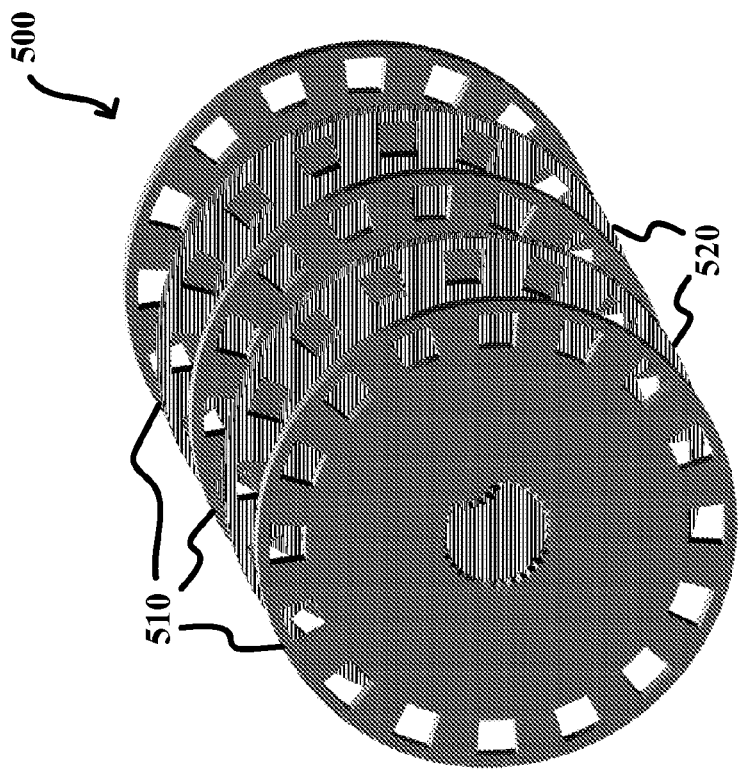
FIG. 5 illustrates a side view of two sets of fluid-shearing discs, according to an example.

FIG. 5 illustrates a side view of two sets of fluid-shearing discs 500 according to an example. The sets of fluid-shearing discs 500 operate in a similar manner as the pair of fluid-shearing discs 400 as previously described. In an example, a set of rotatable discs 520 is interposed between a set of stationary discs 510. All of these discs may be enclosed within a sealed housing 110 filled with a viscous fluid. An applied rotary motion of rotatable discs 520 shears the viscous fluid within the housing 110, resulting in a damping force being generated on the rotary motion.

The strength of the generated damping force can be adjusted in a variety of ways. For instance, the shorter the distance between the stationary discs 510 and the rotatable discs 520, the greater the damping force characteristic that will be produced by the rotatable discs 520 shearing the viscous fluid. Also, each disc has a plurality of slots allowing fluid to pass through. Smaller slots or fewer slots allow for less fluid to flow through the sets of fluid-shearing discs 500, thus creating a stronger damping force characteristic. Conversely, larger slots or more slots allow for more fluid to flow through the sets of fluid-shearing discs 500, creating a weaker damping force characteristic. By adjusting the distance separating the sets of fluid-shearing discs 500 and providing sets of fluid-shearing discs 500 with a certain number of slots and a certain size for each slot, a desired damping force characteristic may be achieved.

In an alternative, the portion of the rotating member 310 that is enclosed within the housing 110 is connected to an impeller. An impeller may be defined as a full circle disc or a sector circle disc having any number of fins extending from the disc perpendicularly. The fins on the impeller may be straight or curved in various implementations, and may protrude from the disc at various lengths. When the rotating member 310 is rotated, the impeller is rotated within the housing 110 containing a viscous fluid. The fins on the impeller impose a shear stress on the fluid as the impeller rotates through the fluid, generating a damping force on the rotary motion. The dimensions of the impeller may vary as long as the impeller is enclosed entirely within the housing 110. A person of ordinary skill in the art would recognize the variety of dimensions and designs that may be used to implement an impeller within the housing 110.

In another example, the housing 110 is connected to a reservoir. The reservoir may be machined into the housing 110, or it may be independent of the housing 110 itself. The connection to the housing 110 may be static, such that fluid can flow between the reservoir and the housing 110, or adjustable, either through manual adjustment or by a valve. The valve may be actuated by pressure, heat, or centripetal forces, just to name a few. Connecting a reservoir of the fluid provides another way to modify the damping forces generated by the rotary damper. Specifically, a reservoir connected to the housing 110 through a valve may be used to regulate a constant pressure of fluid within the housing 110. Viscous fluid expands as it gets warmer, and conversely decreases in volume as it gets cooler. In order to maintain a constant damping force, the rotary damper must have a way to regulate the pressure by increasing or decreasing the combined volume of the fluid and the housing 110. A reservoir is connected to the housing 110 through a valve that is actuated by heat allows the damper to maintain a constant pressure inside the housing 110, and as a result the damping forces generated are more predictable through a range of temperatures.

In yet another example, the two housings of a rotary damper and spring module 100 may be connected to each other, either statically or through a valve. The valve may be actuated by a centripetal force, for example, allowing fluid to flow between the two housings if a great enough horizontal g-force is experienced on the rotary damper and spring module 100. For instance, if the module is on an remote-controlled vehicle, as the vehicle experiences a high-speed turn, it may be advantageous to generate a stronger damping force on the outside wheels of the turn compared to the inside wheels of the turn. Having a strong damping force on the outside wheels would provide more optimal turning performance. In an example, the valve connecting the two housings would allow fluid to flow to the housing in the direction of the experienced horizontal g-force, causing a higher relative pressure in that housing 110 and thus producing a stronger damping force. Alternatively, a single rotary damper may be connected to an external reservoir via a valve actuated by g-forces to achieve a similar result of increased damping during high-speed turns.

While particular aspects and examples are disclosed herein, other aspects and examples will be apparent to those skilled in the art in view of the foregoing teaching. While the examples are described with respect to applications for remote-controlled vehicles, the disclosed systems and methods are not so limited. The various aspects and examples disclosed herein are for illustration purposes only and are not intended to be limiting, with the true scope and spirit being indicated by the following claims.

What is claimed is:

1. A rotary damper for a remote-controlled vehicle comprising:
    a housing containing a fluid;
    a rotary joint on a surface of the housing, wherein the rotary joint is connected to a rotating member between a first end and a second end of the rotating member;
    a protrusion extending from the first end of the rotating member dividing a space within the housing into at least two portions, wherein the protrusion includes an orifice allowing the fluid to flow between the at least two portions within the housing; and
    a rocker arm connected to the second end of the rotating member, wherein the rocker arm has a first end and a second end, wherein the first end of the rocker arm translates linear motion on the rocker arm into rotary motion on the rotating member causing axial rotation of the protrusion.

2. The rotary damper of claim 1, wherein the second end of the rocker arm is connected to an elastic member that resists the rotary motion.

3. The rotary damper of claim 2, further comprising an adjuster mounted to the housing for adjusting a preload of the elastic member.

4. The rotary damper of claim 3, wherein the adjuster comprises a spring, a ball detent, and a cam connected to a first end of the elastic member, wherein rotating the cam changes a contact point of the elastic member.

5. The rotary damper of claim 1, further comprising a reservoir connected to the housing through a valve allowing fluid to flow between the reservoir and the housing.

6. The rotary damper of claim 5, wherein the valve is actuated by heat and maintains a constant fluid pressure within the housing.

7. The rotary damper of claim 5, wherein the valve is actuated by a g-force and varies a fluid pressure within the housing.

8. The rotary damper of claim 1, wherein the housing further includes a sealable hole for allowing the fluid to be replaced.

9. A rotary damper for a remote-controlled vehicle comprising:
a housing containing a fluid;
a first plurality of discs secured to the inside of the housing;
a rotary joint on a surface of the housing, wherein the rotary joint is connected to a rotating member between a first end and a second end of the rotating member;
a second plurality of discs extending from the rotating member, wherein rotation of the rotating member shears the fluid within the housing between the first plurality of discs and the second plurality of discs; and
a rocker arm connected to the second end of the rotating member, wherein the rocker arm has a first end and a second end, wherein the first end of the rocker arm translates linear motion on the rocker arm into rotary motion on the rotating member causing axial rotation of the second plurality of discs.

10. The rotary damper of claim 9, wherein the second end of the rocker arm is connected to an elastic member that resists the rotary motion.

11. The rotary damper of claim 10, further comprising an adjuster mounted to the housing for adjusting a preload of the elastic member.

12. The rotary damper of claim 11, wherein the adjuster comprises a spring, a ball detent, and a cam connected to a first end of the elastic member, wherein rotating the cam changes a contact point of the elastic member.

13. The rotary damper of claim 9, further comprising a reservoir connected to the housing through a valve allowing fluid to flow between the reservoir and the housing.

14. The rotary damper of claim 13, wherein the valve is actuated by heat and maintains a constant fluid volume within the housing.

15. The rotary damper of claim 13, wherein the valve is actuated by a g-force and varies a fluid pressure within the housing.

16. The rotary damper of claim 9, wherein the housing further includes a sealable hole for allowing the fluid to be replaced.

17. An apparatus comprising:
a housing containing a fluid, wherein the housing includes a sealable hole for allowing the fluid to be replaced;
a rotary joint on a surface of the housing, wherein the rotary joint is connected to a rotating member between a first end and a second end of the rotating member;
a protrusion extending from the first end of the rotating member dividing a space within the housing into at least two portions, wherein the protrusion includes an orifice allowing the fluid to flow between the at least two portions within the housing;
a rocker arm connected to the second end of the rotating member, wherein the rocker arm has a first end and a second end, wherein the first end of the rocker arm translates linear motion on the rocker arm into rotary motion on the rotating member causing axial rotation of the protrusion, wherein the second end of the rocker arm is connected to an elastic member that resists the rotary motion;
an adjuster mounted to the housing for adjusting a preload of the elastic member, wherein the adjuster comprises a spring, a ball detent and a cam connected to a first end of the elastic member, wherein rotating the cam changes a contact point of the elastic member; and
a reservoir connected to the housing through a valve allowing fluid to flow between the reservoir and the housing.

18. The apparatus of claim 17, wherein the valve is actuated by heat and maintains a constant fluid pressure within the housing.

19. The apparatus of claim 17, wherein the valve is actuated by a g-force and varies a fluid pressure within the housing.

* * * * *